(12) United States Patent
Miyasaka (10) Patent No.: US 6,670,926 B2
(45) Date of Patent: Dec. 30, 2003

(54) WIRELESS COMMUNICATION DEVICE AND INFORMATION-PROCESSING APPARATUS WHICH CAN HOLD THE DEVICE

(75) Inventor: Toshiki Miyasaka, Urawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/235,415

(22) Filed: Sep. 5, 2002

(65) Prior Publication Data

US 2003/0080906 A1 May 1, 2003

(30) Foreign Application Priority Data

Oct. 31, 2001 (JP) .......................................... 2001-335421

(51) Int. Cl.[7] ................................................. H01Q 1/24
(52) U.S. Cl. ...................... 343/702; 343/720; 455/575.7
(58) Field of Search ................................. 343/702, 720; 455/90, 347, 90.3, 575.5, 575.7

(56) References Cited

U.S. PATENT DOCUMENTS 5,867,131 A 2/1999 Camp, Jr. et al.
6,348,893 B1 * 2/2002 Herranen et al. ........... 343/702

FOREIGN PATENT DOCUMENTS

JP 10-283449 10/1998

* cited by examiner

Primary Examiner—Michael C. Wimer
(74) Attorney, Agent, or Firm—Foley & Lardner (57) ABSTRACT

A wireless communication device to be removably held in a host apparatus. The wireless communication device comprises a printed circuit board, a cover, and a planar antenna module. The printed circuit board comprises electronic components configured to perform wireless communication. The cover covers the electronic components and the upper surface of the board. The planar antenna module has an electromagnetic radiation surface and is provided in the upper surface of the cover such that it is substantially flush with an outer surface of the host apparatus during operation of the wireless communication device.

18 Claims, 8 Drawing Sheets

WIRELESS COMMUNICATION DEVICE AND INFORMATION-PROCESSING APPARATUS WHICH CAN HOLD THE DEVICE

CROSS-REFERENCE TO RELATED APPLICATIONS

This application is based upon and claims the benefit of priority from the prior Japanese Patent Application No. 2001-335421, filed Oct. 31, 2001, the entire contents of which are incorporated herein by reference.

BACKGROUND OF THE INVENTION

1. Field of the Invention

The present invention relates to a wireless communication device and an information-processing apparatus that can hold the device.

2. Description of the Related Art

In recent years, wireless communication devices have come to be mounted in mobile information-processing apparatuses such as notebook-type personal computer and PDAs. To mount a wireless communication device in an information-processing apparatus, two methods may be used. A first method is to incorporate the wireless communication device into the housing of the information-processing apparatus. The second method is to insert the device in the form of a PC card into a PC card slot provided in the housing of the information-processing apparatus. The second method is preferable in view of the manufacturing cost of the mobile information-processing apparatus. This is because the PC card (i.e., wireless communication device) is an optional unit, which the user buys and inserts into the PC card slot after he or she has bought the mobile information-processing apparatus.

Jpn. Pat. Appln. KOKAI Publication No. 10-283449 discloses a wireless communication card shaped like a PC card. The wireless communication card is an extended-type PC card. While inserted in the PC card slot of a mobile information-processing apparatus, the card has its extended part protruding from the housing of the apparatus. The antenna of the wireless communication card is incorporated in the extended part in order to enhance the wireless communication efficiency.

Another wireless communication card is described in U.S. Pat. No. 5,867,131. An antenna is mounted on a dielectric card. The antenna card may be hingeable or slideably mounted to a mobile computer. The antenna card is storable in a recess in the display portion of the mobile computer when not in use. When in use, the antenna card is either rotatably or slideably extended to a deployed position away from the display portion of the mobile computer.

In all of the wireless communication cards discussed above, the extended part, which protrudes from the housing of the apparatus, is not resistant to mechanical impacts. The extended section may be greatly damaged by an impact, depending on the direction of the impact. It may be broken if the user accidentally drops it onto the floor or hits it against anything hard. If this should happen, not only the housing of the extended part, but also the antenna and electronic components that are provided in this part may be broken.

BRIEF SUMMARY OF THE INVENTION

Embodiments of the present invention provide a wireless communication device that can reliably perform its function while held in a host apparatus, without having its antenna protruding from the housing of the apparatus.

According to an embodiment of the present invention, there is provided a planar antenna to be removably held in a surface of a host apparatus having a wireless communication function. The planar antenna comprises an electromagnetic radiation surface that is substantially flush with a surface of the host apparatus during wireless communication.

According to another embodiment of the present invention, there is provided a wireless communication device removably held in a host apparatus. The wireless communication device comprises a planar antenna module having an electromagnetic radiation surface substantially flush with a surface of the host apparatus during operation of the wireless communication device. According to one embodiment of the present invention, the surface of the host apparatus is an outer surface such that the electromagnetic radiation surface is substantially flush with the outer surface during operation of the wireless communication device.

According to other embodiments of the present invention, the wireless communication device comprises a printed circuit board including electronic components configured to perform wireless communication. In one embodiment, a cover is provided for covering the printed circuit board and the electronic components. The planar antenna module may be provided in an upper surface of the cover such that when the wireless communication device is held in the host apparatus the upper surface of the cover and the electromagnetic radiation surface are substantially flush with the surface of the host apparatus. In one embodiment, the upper surface of the cover has a recess, and the planar antenna module is embedded in the recess and the cover has an inner surface covered with a metal layer.

In further embodiments of the present invention, a connector is provided on a lower surface of the printed circuit board and is configured to connect the printed circuit board to the host apparatus.

In still further embodiments of the present invention, a power source is removably mounted on a lower surface of the printed circuit board for supplying electric power to the electronic components. In one embodiment, the power source is a battery. In another embodiment, the power source is one or more solar cells. In further embodiments, the power source may be a combination of at least one battery and one or more solar cells.

According to one embodiment, the host apparatus is an information-processing apparatus for performing wireless communication. The information-processing apparatus comprises a housing, a display unit rotatable, with respect to the housing, between an opened position and a closed position, and having a front surface and a back surface, the back surface having a recess therein. The wireless communication device is removably provided in the recess and includes a planar antenna module having an electromagnetic radiation surface substantially flush with the back surface of the information-processing apparatus during operation of the wireless communication device.

Additional features and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodi

DETAILED DESCRIPTION OF THE INVENTION

Embodiments of the present invention will be described, with reference to the accompanying drawings.

A wireless communication device according to a first embodiment of the invention and an information-processing apparatus that can hold the wireless communication device will be described, with reference to FIGS. 1 and 2. The information-processing apparatus is, for example, a mobile apparatus such as, but not limited to, a notebook-type personal computer or a PDA. Hereinafter, the apparatus will be described as a notebook-type personal computer 1.

Figure 1:
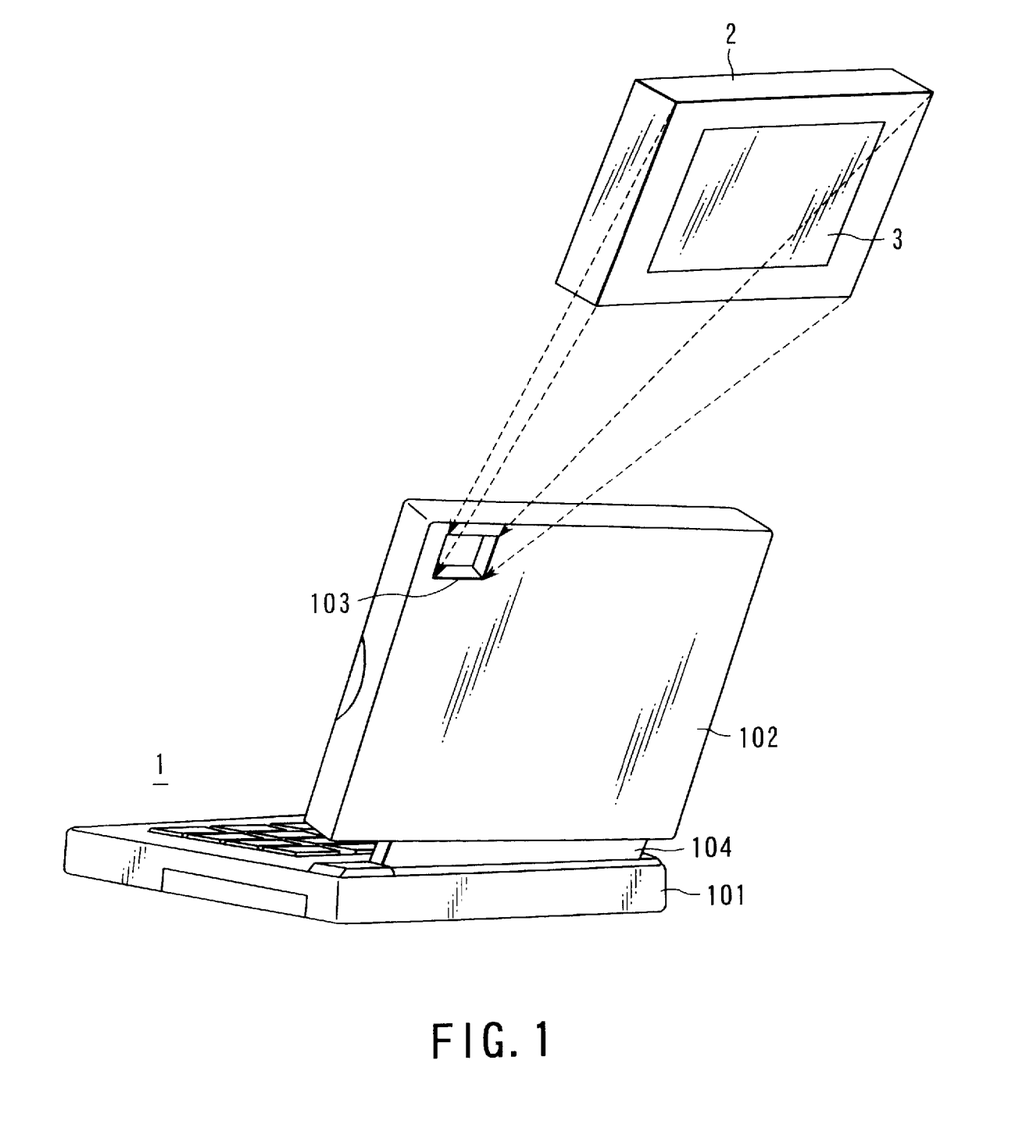
- FIG. 1 is a rear, perspective view showing a wireless communication device according to a first embodiment of the invention, and a computer that can hold the wireless communication device, having its display unit opened.

FIG. 1 shows the notebook-type personal computer 1 as viewed from the rear and having its display unit opened. The computer 1 comprises a housing 101 and a display unit 102.

The display unit 102 incorporates a flat panel display that is an LCD (Liquid Crystal Display). The display unit 102 is hinged to the housing 102 and can be rotated, with respect to the housing 101, between an opened position and a closed position.

The housing 101 is shaped like a shallow rectangular box. Input devices, such as a keyboard and a pointing device, are arranged on the upper surface of the housing 101. A display hinge 104 is secured to the rear edge of the upper surface of the housing 101. The display hinge 104 supports the display unit 102 to the housing 102, allowing the display unit 102 to rotate between the opened position and the closed position.

The display unit 102 has a recess 103 in its back. The recess 103 can accommodate a wireless communication device 2. A printed circuit board (not shown) lies on the bottom of the recess 103 to connect the wireless communication device 2 to the personal computer 1.

The wireless communication device 2 is a module that comprises a housing, some electronic components and an antenna. The electronic components and the antenna cooperate to perform wireless communication. The housing of the wireless communication device 2 has such shape and size as can be fitted in the recess 103 made in the back of the display unit 102 of the personal computer 1. Since the recess 103 defines a substantially rectangular space, the housing of the wireless communication device 2 is a rectangular box that is almost as large as (i.e., a little smaller than) the recess 103. The wireless communication device 2 has a planer antenna module 3, which is embedded in the upper surface of the housing. The planer antenna module 3 has an electromagnetic radiation surface. The radiation surface is exposed outside and substantially flush with the upper surface of the housing of the wireless communication device 2.

The planar antenna module 3 has a relatively high directivity. The region that the module 3 can cover to receive radio waves tends to lie in the front of the electromagnetic radiation surface (i.e., at the back of the display unit 102), rather than at the hack of the radiation surface (i.e., in front of the display unit 102). Nonetheless, the planar antenna module 3 can also cover a region lying at the back of the radiation surface. This is because the recess 103 made in the back of the display unit 102 is located near the upper edge thereof.

Figure 2:
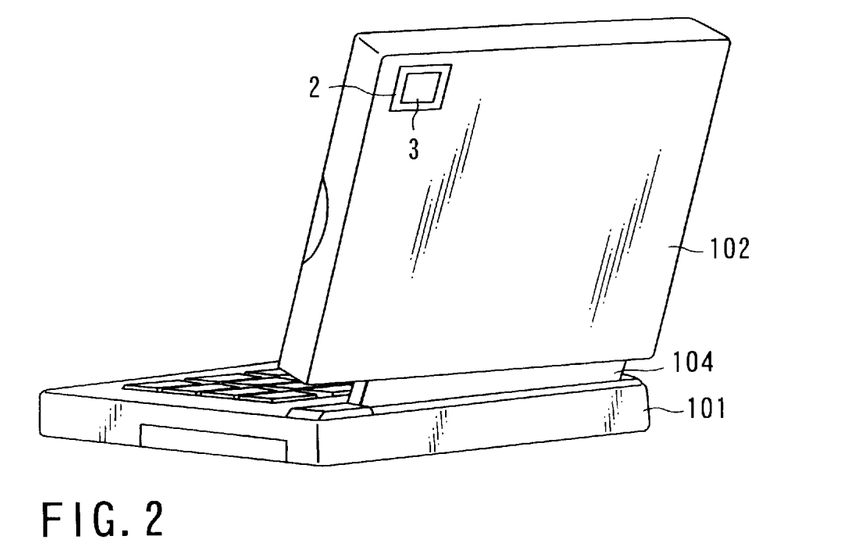
FIG. 2 is a rear, perspective view showing the computer and the device being held in a surface of the display unit of the computer, according to embodiments of the present invention.

FIG. 2 shows the personal computer 1 that holds the wireless communication device 2. As illustrated in FIG. 2, the wireless communication device 2 is fitted in the recess 103 cut in the back of the display unit 102. While held in the recess 103, the upper surface of the wireless communication device 2 is substantially flush with the back of the display unit 102 and does not project from the display unit 102. Hence, the back of the display unit 102 is flat and smooth as a whole. Since its electromagnetic radiation surface is exposed in its entirety, the planer antenna module 3 can advantageously achieve efficient radio communication, though its antenna section does not protrude from the display unit 102 of the personal computer 1.

The wireless communication device 2 is an optional one that can be inserted and removed into and from the recess 103. The recess 103 may be filled with a cap made of, for example, rubber, while the device 2 is not being used in combination with the personal computer 1. If this is the case, the back of the display unit 102 can be flat and smooth as a whole.

Figure 3:
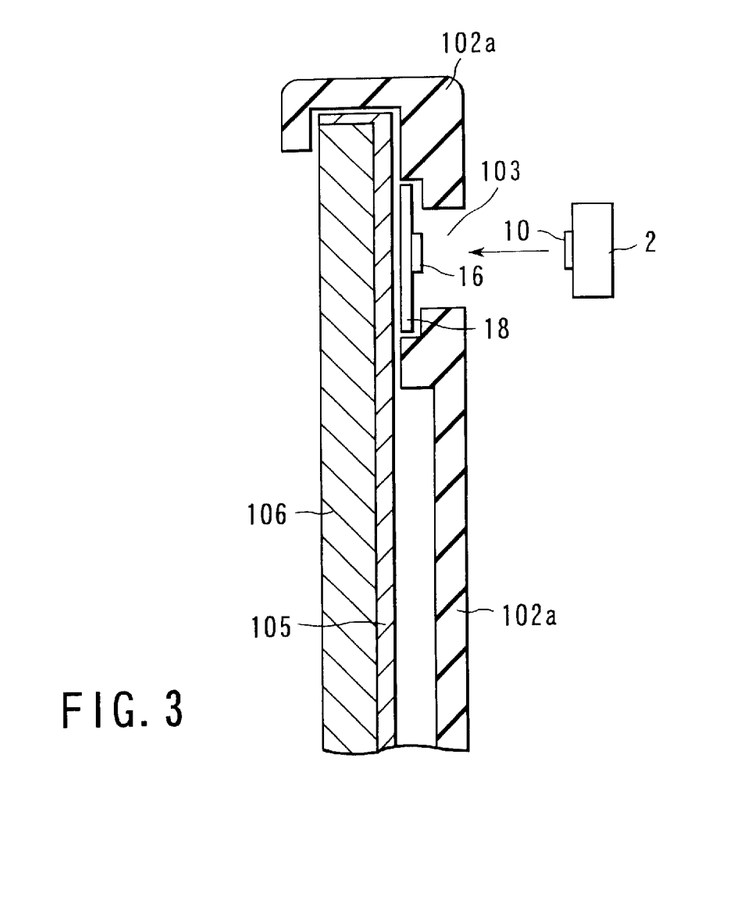
FIG. 3 is a cross-sectional view illustrating an example of the display unit of the computer, according to embodiments of the present invention.

FIG. 3 is a cross-sectional view of the display unit 102, showing the recess 103 and some components of the unit 102, which lie near the recess 103.

The display unit 102 comprises an outer wall 102a that defines the back of the unit 102. The outer wall 102a has a rectangular opening, through which the wireless communication device 2 can be inserted into the recess 103. The display unit 102 contains a flat panel display 106. The flat panel display 106 is arranged, with its back opposing the back of the display unit 102. A metal plate 105 covers the entire back of the flat panel display 106. The metal plate 105 serves as the frame of the flat panel display 106. The printed circuit board 18, mentioned earlier, lies between the outer wall 102a and the metal plate 105. The printed circuit board 18 has a connector 16 that can connect the wireless communication device 2 to the personal computer 1. The space between the printed circuit board 18 and the wall 102a, which opens at the wall 102, is the recess 103.

The wireless communication device 2 has a connector 10 on the lower surface. The connector 10 contacts the connector 16 provided in the flat panel display unit 106, as long as the wireless communication device 2 remains in the recess 103. The wireless communication device 2 is thus connected to the personal computer 1, mechanically and electrically.

The metal plate 105 can shield electromagnetic waves. It can therefore minimize the influence that the electromagnetic waves emanating from the wireless communication device 2 may impose on the electronic components of the computer 1.

The wireless communication device 2 will now be described in terms of its structure.

Figure 4:
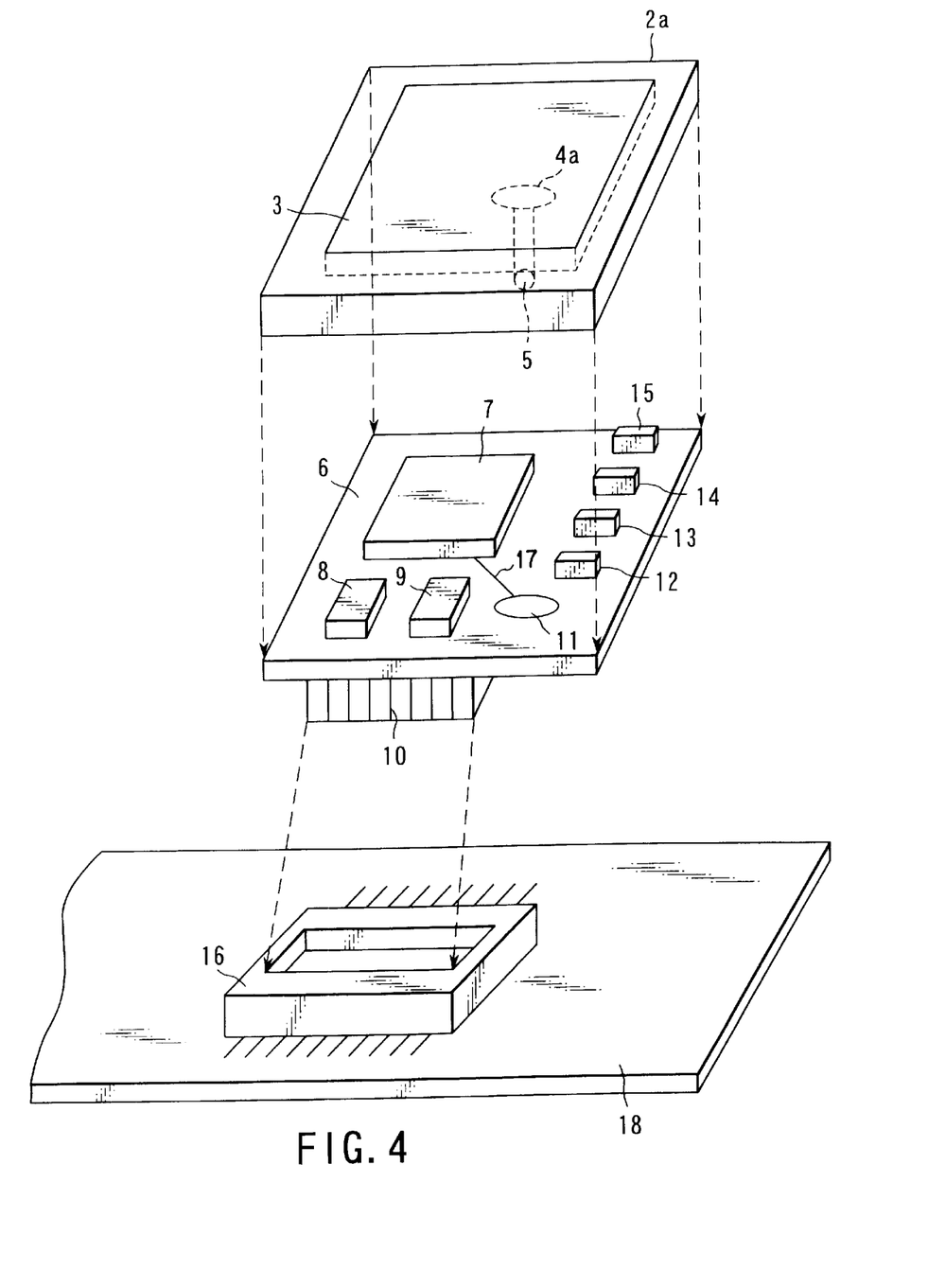
FIG. 4 is an exploded view of the wireless communication device according to a first embodiment of the present invention.

FIG. 4 is an exploded view of the wireless communication device 2. As is illustrated in FIG. 4, the wireless communication device 2 includes a cover 2a and a printed circuit board 6. The cover 2a covers the printed circuit board 6. The cover 2a is a rectangular case that opens at the lower surface. The planer antenna module 3 is embedded in the upper surface of the cover 2a, with its electromagnetic radiation surface exposed to the outside of the computer 1. The planer antenna module 3 has an insulating base that is a thin plate that may be about 4 mm thick. One surface of the insulating base functions as the electromagnetic radiation surface. The planar antenna module 3 is, for example, a patch antenna that is one type of a micro-strip antenna.

A contact 4a lies on the electromagnetic radiation surface of the planar antenna module 3. The contact 4a connects the radiation surface to a conduction path that penetrates the insulating base. More precisely, the contact 4a is connected to the feeding terminal 5 provided on the back of the planar antenna module 3. The feeding terminal 5 extends from the lower surface of the cover 2a and is connected to the antenna terminal 11 mounted on the printed circuit board 6 via a wiring cable (not shown). A land or connector 17 that is provided on the printed circuit board 6 connects the antenna terminal 11 to the wiring cable.

The printed circuit board 6 is a hard plate. It holds a wireless communication IC 7 on its surface. A quartz oscillator 8, a flash EEPROM 9, and other electronic components 12 to 15 are also mounted on the printed circuit board 6. Among the electronic components 12 to 15 are, for example, chip resistors and chip capacitors. The wireless communication IC 7 is the main electronic component provided on the printed circuit board 6 and is designed to implement wireless communication. The IC 7 is a one-chip LSI comprising an RF section and a base-band section. The RF section performs upward conversion, converting an intermediate frequency to an RF frequency. The RF section also performs downward conversion, from an RF frequency to an intermediate frequency. The base-band section modulates data to transmit and demodulates data received, in accordance with a prescribed protocol of wireless communication. The quartz oscillator 8 generates the operating clock signal of the wireless communication IC 7. The flash EEPROM 9 stores the firmware that controls the wireless communication IC 7. The firmware is a program that describes the sequence of protocol stacks for controlling the operation of the base-band section.

The printed circuit board 6 serves as the base of the wireless communication device 2. The printed circuit board 6 holds a connector 10 (i.e., plug) on its lower surface. The connector 10 can be connected to the connector 16, or receptacle (e.g., stacking connector), mounted on a printed circuit board 18. The printed circuit board 18 is provided in the back of the display unit 102 of the personal computer 1.

Figure 5:
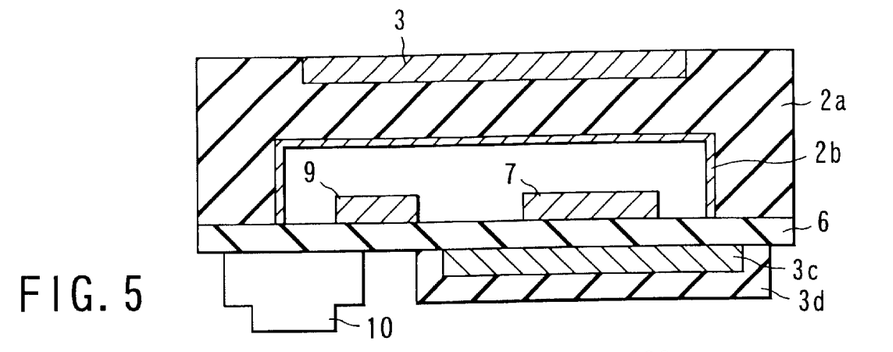
FIG. 5 is a cross-sectional view depicting the structure of the wireless communication device according to the first embodiment of the present invention.

FIG. 5 is a cross-sectional view of the wireless communication device 2.

Figure 6:
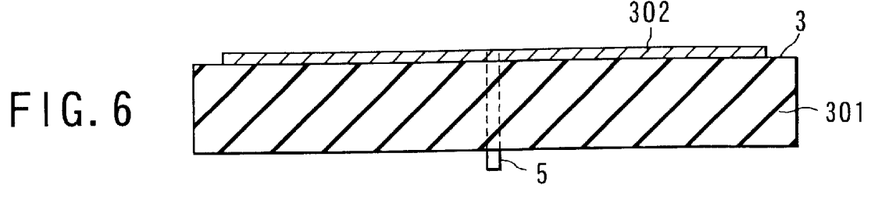
FIG. 6 is a cross-sectional view of the planar antenna provided in the device according to the first embodiment of the present invention.

The cover 2a covers the upper surface of the printed circuit board 6 and, hence, all electronic components mounted on the upper surface of the printed circuit board 6. The planar antenna module 3 is embedded in the upper surface of the cover 2a, with its electromagnetic radiation surface lying substantially flush with the upper surface of the cover 2a. In other words, the cover 2a has a recess in its upper surface and the planar antenna module 3 is held in the recess. As FIG. 6 shows, the module 3 comprises a base 301 and a metal layer 302. The base 301 is made of insulating material such as resin. The metal layer 302 (also known as "patch") may be made, for example, by forming a copper foil on the base 301 and then plating the copper foil with gold. The feeding terminal 5 protrudes from the lower surface of the base 301.

The cover 2a is also made of insulating material. As FIG. 5 depicts, a metal layer 2b formed by, for example, plating, covers the entire inner surface of the cover 2a. The metal layer 2b functions as an electromagnetic shield to the electronic components mounted on the printed circuit board 6. The cover 2a has its lower surface bonded with an adhesive or the like to the upper surface of the printed circuit board 6.

While the connector 10 of the wireless communication device 2 remains connected to the connector 16 set in the recess 103, a space exists in the recess 103, at the back of the printed circuit board 6. In this space lies a cell box 3d that contains a button cell 3c. The button cell 3c can be removed from the cell box 3d. The button cell 3c comprises at least one battery to supply electric power to the electronic components mounted on the upper surface of the printed circuit board 6. Thanks to the button cell 3c, no power needs to be supplied to the wireless communication device 2 from the personal computer 1. It therefore suffices to arrange signal pins between the computer 1 and the wireless communication device 2. That is, power need not be supplied from the computer 1 to the wireless communication device 2. Locating the cell box 3d in the lower surface of the printed circuit board 6 achieves an efficient use of the recess 103 and renders it unnecessary to supply power from the computer 1 to the wireless communication device 2.

According to embodiments of the present invention, the button cell 3c comprises at least one battery which is rechargeable. In one embodiment, the battery may be removed from the wireless communication device 2 and recharged, for example, in a separate recharging unit (not shown).

Figure 7:
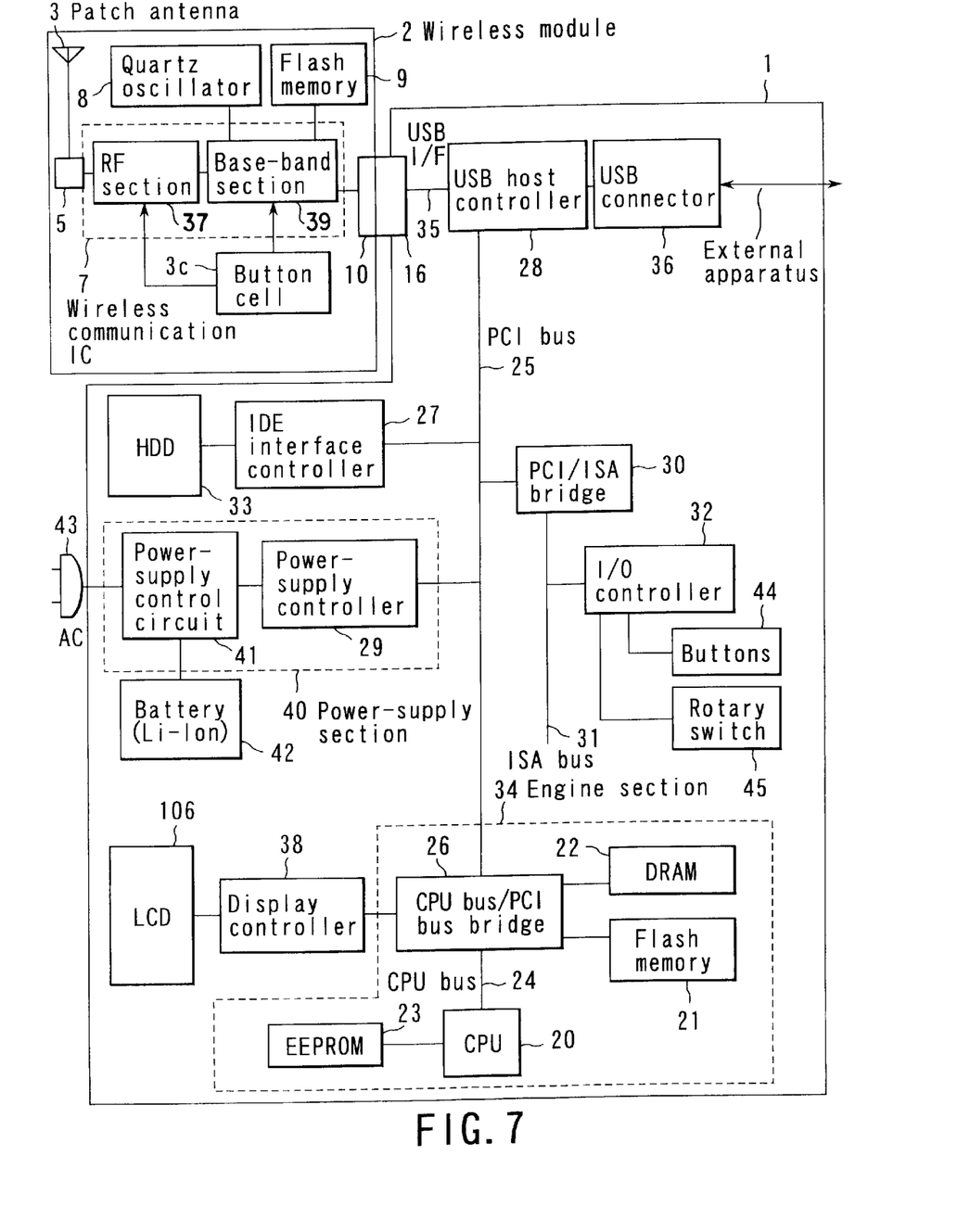
FIG. 7 is a block diagram of a system that comprises the wireless communication device according to the first embodiment of the present invention and the computer that can hold the wireless communication device.

In another embodiment, the battery may remain in the wireless communication device 2 and be recharged by a power source providing power to the computer 1 (for example the output of the AC adapter 43 or the battery (Li-ion) 42). According to this embodiment, a battery in the button cell 3c can be recharged while the wireless communication device 2 is provided in the computer 1. Appropriate power connections may be provided between computer 1 and the wireless communication device 2 for recharging the battery in the button cell 3c. The recharging of the battery in the button cell 3c may be initiated through appropriate hardware and/or software means.

In the wireless communication device 2 according to the first embodiment, the cover 2a covers the printed circuit board 6 as indicated above. The planar antenna module 3 is embedded in the upper surface of the cover 2a, with its electromagnetic radiation surface 302 exposed to the outside. Therefore, the wireless communication device 2 is a two-layered structure that comprises a lower layer, i.e., printed circuit board 6, and an upper layer, i.e., planar antenna module 3 located above the printed circuit board 6. Further, the upper surface of the wireless communication device 2 is flat and smooth, because the planar antenna module 3 is embedded in the upper surface of the cover 2a, i.e., the uppermost part of the wireless communication device 2. Thus, as long the wireless communication device 2 remains in the recess 103, the antenna section does not project from the back of the display unit 102 and the electromagnetic radiation surface 302, which lies on the module 3, remains exposed to the outside of the computer 1. This imparts sufficient wireless communication efficiency to the wireless communication device 2.

As described above, according to embodiments of the present invention the base of the planar antenna module 3 may be about 4 mm thick. According to one embodiment, only the upper half (about 2 mm thick) of the base 301 may be embedded in the recess of the cover 2a. Even in this case, the upper surface of the wireless communication device 2 is sufficiently smooth.

FIG. 7 is a block diagram of a system that comprises the personal computer 1 and the wireless communication device 2.

The personal computer 1 has an engine section 34 that controls the other components of the computer 1. The engine section 34 comprises a CPU 20, a flash memory 21, a DRAM 22, an EEPROM 23, a CPU bus 24 and a PCI bus 25, and a bus bridge 26. The flash memory 21 stores programs including BIOS. The DRAM 22 is the main memory of the computer 1. The EEPROM 23 is provided to store various items of information such as, but not limited to, configuration information. The bus bridge 26 connects the CPU bus 24 and the PCI bus 25. The bus bridge 26 incorporates a memory controller designed to control the flash memory 21 and the DRAM 22. The bus bridge 26 also incorporates an interface unit, which functions as an interface between the other components of the engine section 34 and a display controller 38. The display controller 38 controls the flat panel display 106.

The personal computer 1 comprises an IDE interface controller 27, a USB host controller 28, a power-supply controller 29, a PCI/ISA bridge 30, an ISA bus 31, an I/O controller 32, various buttons 44, and a rotary switch 45. The controllers 27, 28 and 29 and the PCI/ISA bridge 30 are connected to the PCI bus 25. The I/O controller 32 is connected to the ISA bus 31 to control the buttons 44 and the rotary switch 45.

The computer 1 further comprises an HDD 33, a power-supply control circuit 41, and a battery (Li-ion) 42. The HDD 33 is connected to the IDE interface controller 27. The power-supply control circuit 41 and the power-supply controller 29 constitute a power-supply section 40 that controls the power supply in the personal computer 1. The power-supply control circuit 41 generates an operating power from the battery 42 or the output of the AC adapter 43. The operating power is supplied via the power-supply controller 29 to the other components of the computer 1.

The wireless communication device 2 is a small wireless module that accords with the short-distance wireless communication standard such as Bluetooth™. A USB (Universal Series Bus) connects the wireless communication device 2 to the personal computer 1. The USB host controller 28 controls any external USB device to be connected to the USB connector 36. Further, a USB interface line 35 connects the controller 28 to the connector 16 provided in the back of the display unit 102.

The wireless communication device 2 (i.e., a Bluetooth™ module) comprises antenna 3, wireless communication IC 7, quartz oscillator 8, flash memory 9, and button cell 3c, as indicated earlier. The wireless communication IC 7 has an RF section 37 and a base-band section 39. The base-band section controls the wireless communication function of Bluetooth™. It performs the wireless communication between the wireless communication device 2 and an external apparatus (not shown).

In one embodiment, the user can operate the rotary switch 45 to assign a PIN (Personal Identification Number) to the Bluetooth™ module 2.

Figure 8:
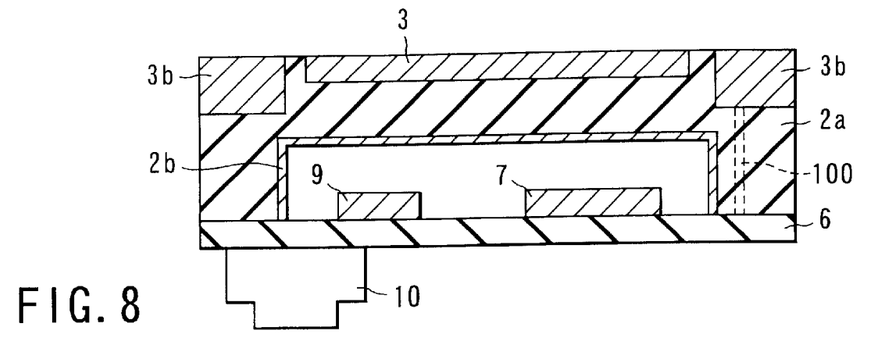
FIG. 8 is a cross-sectional view of a wireless communication device according to a second embodiment of the present invention.
Figure 9:
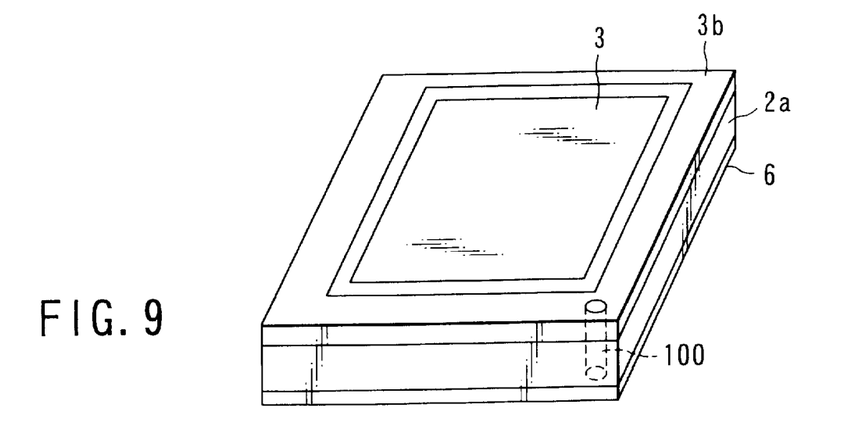
FIG. 9 is a perspective view of the wireless communication device according to the second embodiment of the present invention.

A wireless communication device 2 according to a second embodiment of the invention will be described with reference to FIGS. 8 and 9. FIGS. 8 and 9 are a cross-sectional view and a perspective view, respectively, of this wireless communication device.

The wireless communication device 2 has a solar cell module 3b embedded in the upper surface of the cover 2a, whereas the wireless communication device 2 of FIGS. 1 to 7 has a button cell 3c provided on the lower surface of the cover 2a. In all other respects, the second embodiment is identical to the first embodiment.

In the wireless communication device 2 according to the second embodiment, the solar cell module 3b converts light energy to electric energy, which is supplied to the electronic components mounted on the printed circuit board 6. Like the planar antenna module 3, the solar cell module 3b is embedded in the upper surface of the cover 2a. The light-receiving surface of the cell module 3b lies substantially flush with the upper surface of the cover 2a. The module 3b includes a plurality of solar cells (not shown). The solar cell module 3b may be shaped like a ring to surround the circumferential surface of the planar antenna module 3.

A conducting path 100 penetrates the cover 2a, connecting the solar cell module 3b to the printed circuit board 6. The power the solar cell module 3b has generated is supplied via the conducting path 100 to the electronic components mounted on the printed circuit board 6.

The upper surface of the cover 2a remains exposed while the wireless communication device 2 is held in the recess 103 made in the back of the display unit 102, as has been described with reference to FIGS. 1 to 7. The solar cell module 3b, which is embedded in the upper surface of the cover 2a, can efficiently receive light and can, hence, generate electric power at high efficiency.

Figure 10:
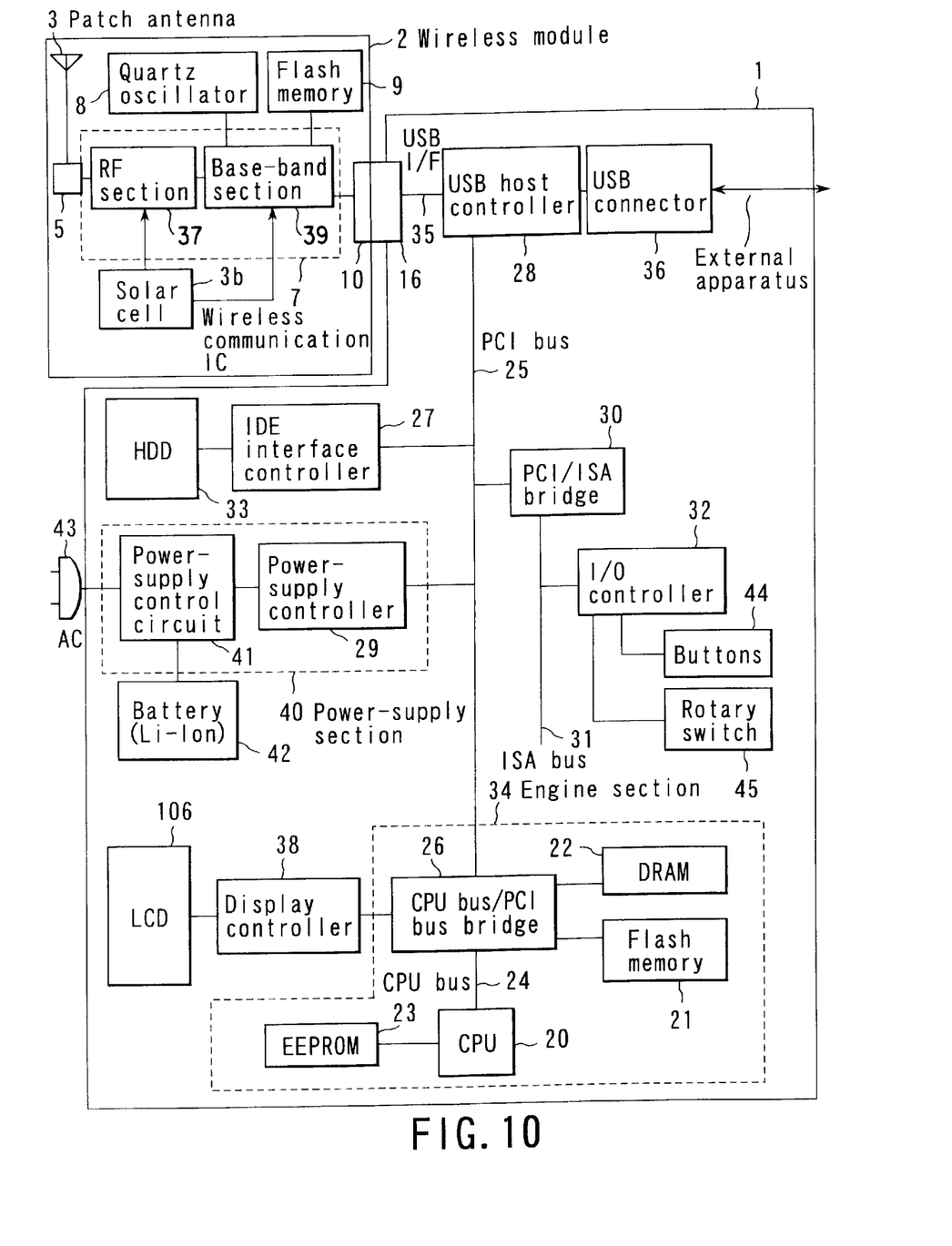
FIG. 10 is a block diagram of a system that comprises the wireless communication device according to the second embodiment of the present invention and the computer that can hold this wireless communication device.

FIG. 10 is a block diagram of a system that comprises the wireless communication device 2 according to the second embodiment and a personal computer 1. This personal computer 1 is identical to the personal computer 1 illustrated in FIG. 7. As described above, the solar cell module 3b is used as a power supply in the wireless communication device 2 according to the second embodiment. The power generated by the solar cell module 3b is supplied to the electronic components provided on the printed circuit board 6.

In the wireless communication device 2 of FIGS. 1 to 7 (the first embodiment), the wireless communication device 2 must be removed from the recess 103 to be replaced by a new button cell. In the wireless communication device 2 shown in FIG. 8 (the second embodiment), the solar cell module 3b need not be replaced as long as it functions well. Hence, the second embodiment is therefore more convenient than the first embodiment.

Figure 11:
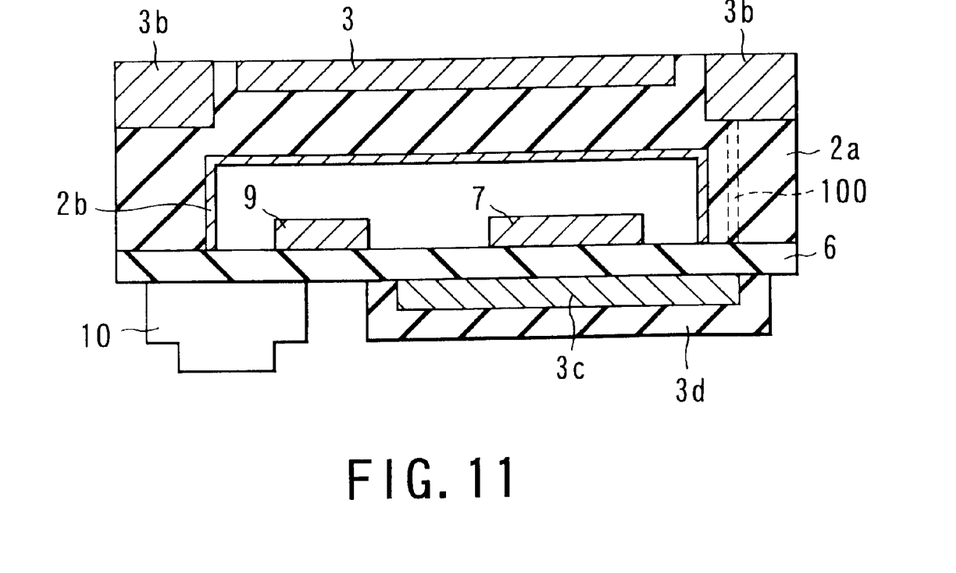
FIG. 11 is a cross-sectional view of a wireless communication device according to a third embodiment of the present invention.
Figure 12:
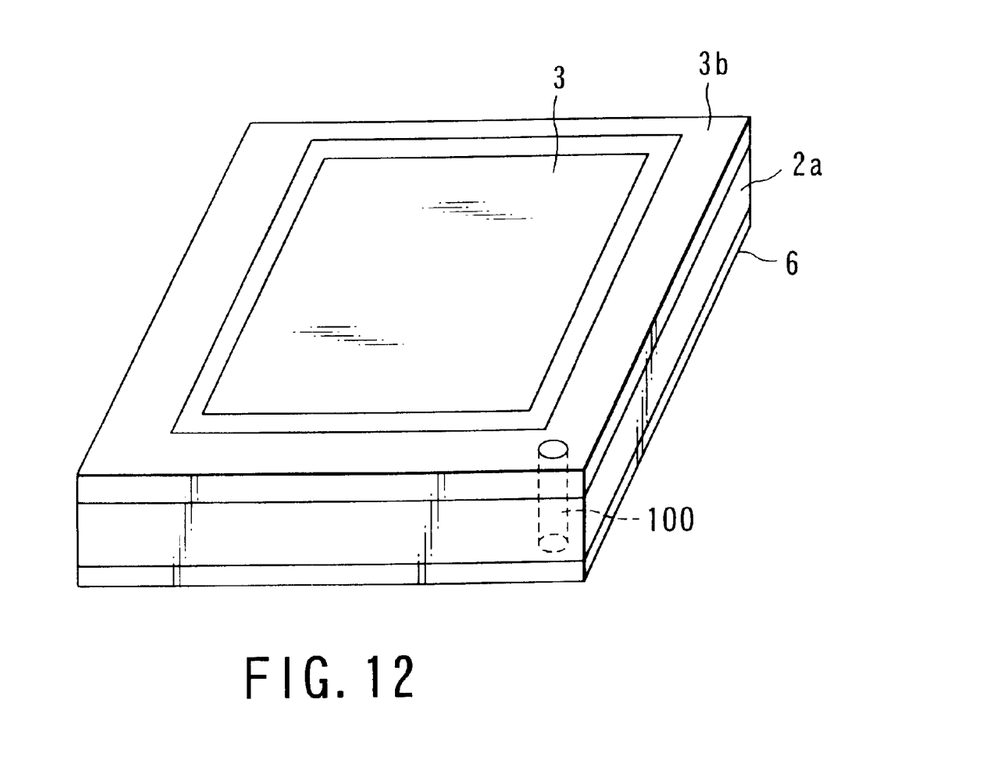
FIG. 12 is a perspective view of the wireless communication device according to the third embodiment of the present invention.

A wireless communication device 2 according to a third embodiment of this invention will be described with reference to FIGS. 11 and 12. FIGS. 11 and 12 are a cross-sectional view and a perspective view, respectively, of this wireless communication device.

The third embodiment includes a cell box 3d on the lower surface of the printed circuit board 6 and a solar cell module 3b embedded in the upper surface of the cover 2a. A button cell 3c can be set into and removed from the cell box 3d. In all other respects, the third embodiment is identical to the first embodiment.

Figure 13:
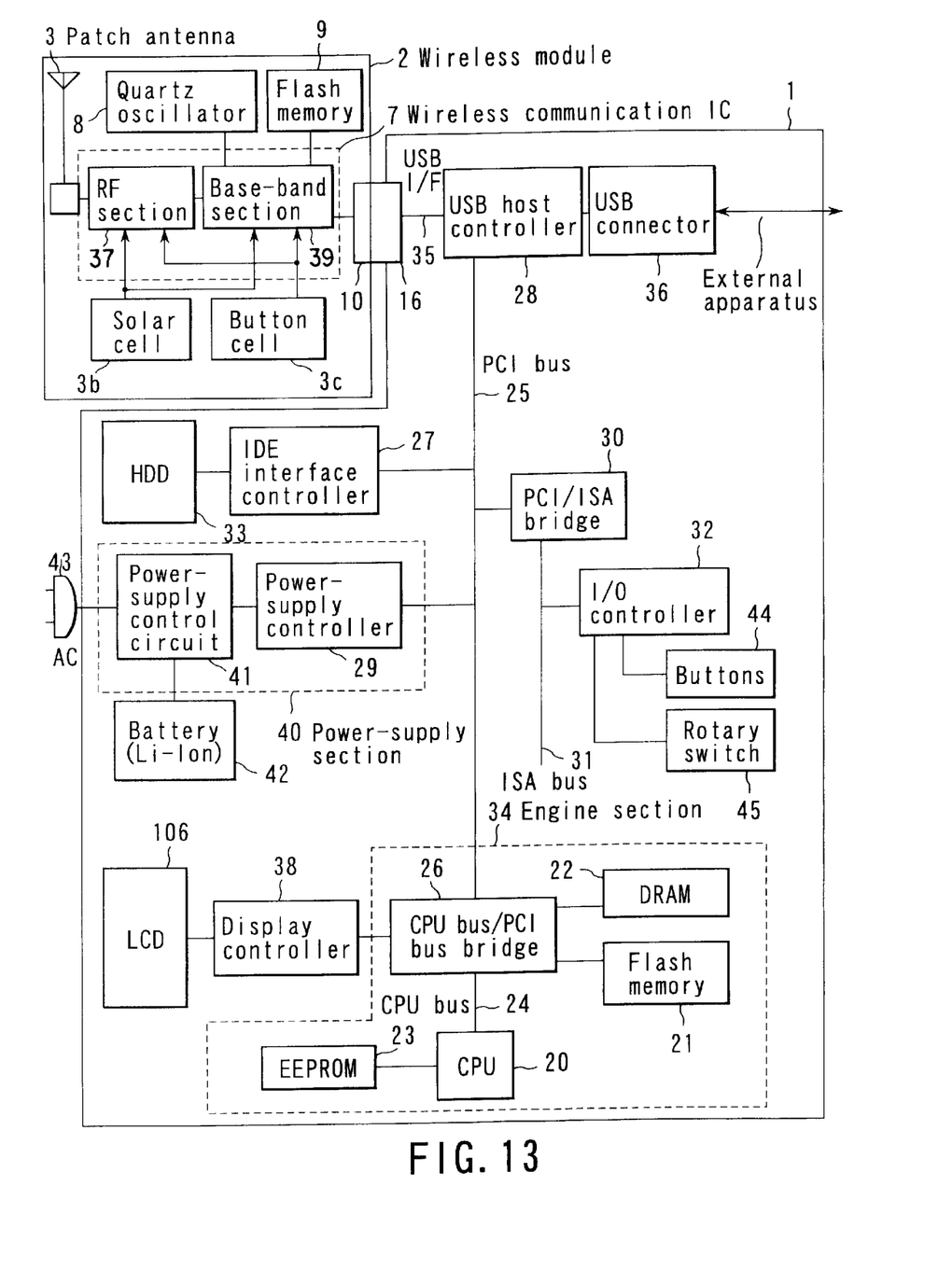
FIG. 13 is a block diagram of a system that comprises the wireless communication device according to the third embodiment of the present invention and the computer that can hold the wireless communication device.

FIG. 13 is a block diagram of a system that comprises the wireless communication device 2 according to the third embodiment and a personal computer 1. This personal computer 1 is identical to the personal computer 1 illustrated in FIG. 7. In the third embodiment, the solar cell module 3b and the button cell 3c are used as power supplies. The power generated by the solar cell module 3b and button cell 3c is supplied to the electronic components provided on the printed circuit board 6.

Having the button cell 3c, the wireless communication device 2 according to the third embodiment can operate in places where the solar cell module 3b cannot receive sufficient light.

It is desirable to make the recess 103 in the back of the display unit 102 as described above. Nonetheless, the recess 103 may be provided in one side of the housing 101 of the computer 1. It suffices to provide the recess 103 in a housing of the information-processing apparatus that functions as the host apparatus to the wireless communication device 2. Then, the wireless communication device 2 can be provided in the apparatus, without protruding from the housing of the apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication device removably held in a host apparatus, said wireless communication device comprising:
   a printed circuit board including electronic components configured to perform wireless communication;
   a cover which covers the printed circuit board and the electronic components; and
   a planar antenna module provided in an upper surface of the cover such that the planar antenna module is opposed to the printed circuit board and arranged in parallel with the printed circuit board, the planar antenna module having an electromagnetic radiation surface substantially flush with a surface of the host apparatus during operation of the wireless communication device, the electromagnetic radiation surface being electrically connected to the printed circuit board.

2. The wireless communication device according to claim 1, wherein the surface of the host apparatus is an outer surface such that the electromagnetic radiation surface is substantially flush with the outer surface during operation of the wireless communication device.

3. The wireless communication device according to claim 1, further comprising a connector provided on a surface of the printed circuit board and configured to connect the printed circuit board to the host apparatus.

4. The wireless communication device according to claim 3, wherein the surface of the printed circuit board is a lower surface of the printed circuit board.

5. The wireless communication device according to claim 1, further comprising a power source removably mounted on the printed circuit board and electrically connected thereto for supplying electric power to the electronic components.

6. The wireless communication device according to claim 5, wherein the power source is rechargeable.

7. The wireless communication device according to claim 6, wherein the power source remains mounted on the printed circuit board during recharging and wherein the power source is recharged by a power source providing power to the host apparatus.

8. The wireless communication device according to claim 1 further comprising a solar power source electrically connected to the printed circuit board.

9. The wireless communication device according to claim 5, wherein the power source is removably mounted on a lower surface of the printed circuit board.

10. The wireless communication device according to claim 1, wherein the cover has an inner surface covered with a metal layer.

11. The wireless communication device according to claim 1, wherein the upper surface of the cover has a recess, and the planar antenna module is provided in the recess.

12. The wireless communication device according to claim 1, further comprising a solar cell module provided in the upper surface of the cover, surrounding the planar antenna module and including a plurality of solar cells for generating electric power to be supplied to the electronic components.

13. A wireless communication device removably held in a host apparatus, said wireless communication device comprising:
   a printed circuit board having an upper surface and a lower surface and including electronic components configured to perform wireless communication, the electronic components being mounted on the upper surface of the printed circuit board;
   a cover covering the upper surface of the printed circuit board and the electronic components;
   a connector provided on the lower surface of the printed circuit board and configured to connect the printed circuit board to the host apparatus; and
   a planar antenna module provided in an upper surface of the cover such that the planar antenna module is opposed to the printed circuit board and arranged in parallel with the printed circuit board, the planar antenna module having an electromagnetic radiation surface substantially flush with a surface of the host apparatus during operation of the wireless communication device, the electromagnetic radiation surface being electrically connected to the printed circuit board.

14. An information-processing apparatus for performing wireless communication, comprising:

a housing having a surface and a recess therein; and a wireless communication device removably provided in the recess, the wireless communication device comprising:

a printed circuit board having electronic components thereon configured to perform wireless communication;

a cover which covers the printed circuit board and the electronic components; and a planar antenna module provided in an upper surface of the cover such that the planar antenna module is opposed to the printed circuit board and arranged in parallel with the printed circuit board, the planar antenna module having an electromagnetic radiation surface substantially flush with a surface of the information-processing apparatus during operation of the wireless communication device, the electromagnetic radiation surface being electrically connected to the printed circuit board.

15. An information-processing apparatus for performing wireless communication, comprising:

a housing;

a display unit rotatable, with respect to the housing, between an opened position and a closed position, and having a front surface and a back surface, the back surface having a recess therein; and a wireless communication device removably provided in the recess and comprising:

a printed circuit board having electronic components thereon configured to perform wireless communication;

a cover which covers the printed circuit board and the electronic components; and a planar antenna module provided in an upper surface of the cover such that the planar antenna module is opposed to the printed circuit board and arranged in parallel with the printed circuit board, the planar antenna module having an electromagnetic radiation surface substantially flush with the back surface of the display unit during operation of the wireless communication device, the electromagnetic radiation surface being electrically connected to the printed circuit board.

16. An information-processing apparatus according to claim 15, wherein the display unit incorporates a flat panel display exposed at the front surface and having a back surface covered with a metal plate for shielding against electromagnetic waves.

17. An information-processing apparatus for performing wireless communication, comprising:

a housing;

a display unit rotatably connected to the housing, the display unit having a surface with a recess provided therein;

a first printed circuit board provided in the display unit, the first printed circuit board having a first connector; and a wireless communication device removably provided in the recess, the wireless communication device comprising:

a second printed circuit board having electronic components and a second connector thereon, the second connector for connecting to the first connector when the wireless communication device is stored in the recess; and an electromagnetic radiation surface configured to form a part of the surface of the display unit when the wireless communication device is stored in the recess.

18. The information-processing apparatus according to claim 17, wherein the wireless communication device includes an antenna having the electromagnetic radiation surface.

* * * * *